United States Patent
Siddiqui

Patent Number: 5,912,661
Date of Patent: Jun. 15, 1999

[54] Z-ENCODER MECHANISM

[75] Inventor: Kabir Siddiqui, Redmond, Wash.

[73] Assignee: Microsoft Corp., Redmond, Wash.

[21] Appl. No.: 08/782,411

[22] Filed: Jan. 14, 1997

[51] Int. Cl.⁶ .................................................. G01D 15/08
[52] U.S. Cl. ........................ 345/166; 345/157; 345/163
[58] Field of Search .................................. 345/156, 157,
345/163, 164, 165, 167, 166; 74/471 XY;
200/11 R, 11 G, 28

[56] References Cited

U.S. PATENT DOCUMENTS

| | | | |
|---|---|---|---|
| 3,582,015 | 6/1971 | Laschenski | 242/350 |
| 4,739,138 | 4/1988 | Wolf | 200/155 R |
| 4,982,618 | 1/1991 | Culver | 74/471 XY |
| 5,235,868 | 8/1993 | Culver | 74/471 XY |
| 5,446,481 | 8/1995 | Gillick et al. | 345/163 |
| 5,473,344 | 12/1995 | Bacon et al. | 345/163 |
| 5,516,993 | 5/1996 | Wecke et al. | 200/17 R |

FOREIGN PATENT DOCUMENTS

44 05 314 C1   6/1995   Germany .

*Primary Examiner*—Jeffery A. Hofsass
*Assistant Examiner*—Ashok Mannava

*Attorney, Agent, or Firm*—Klarquist Sparkman Campbell Leigh & Whinston, LLP

[57] ABSTRACT

A z-encoder for a computer input device includes a wheel button that is supported on an axle or spindle within the housing of the input device. The axle is supported in the housing by spaced-apart axle supports. The axle supports are configured to allow one end of the axle to move in a direction perpendicular to the axis of rotation of the wheel button such that the wheel button may be depressed, tilting the axle sightly. A spring mounted within the housing is arranged to resist depression of the wheel button.

An optical encoder may be positioned on the axle for rotation with the wheel button. A light source and a light sensor may be mounted within the housing so as to sense the motion of the optical encoder to provide a positioning signal. A microswitch may be mounted within the housing, and a switch engager on the axle may be arranged to depress the microswitch when the wheel button is depressed, thereby providing a button signal. A detent mechanism may also be provided on the axle and may engage a detent spring mounted within the housing to provide a segmented feel to the rotation of the wheel button. The size of the segments may be proportioned to the resolution of the optical encoder.

27 Claims, 5 Drawing Sheets

Z-ENCODER MECHANISM

FIELD OF THE INVENTION

This invention relates to a z-encoder mechanism for a computer mouse or other input device, the mechanism having a wheel with a rim thereof protruding from the housing of the input device, the wheel being simultaneously both rotatable and depressable by a user of the input device to provide desired signals to a computer.

BACKGROUND AND SUMMARY OF THE INVENTION

Computer pointing devices such as mice and trackballs enable a user to conveniently and efficiently interact with a computer. Mice include a moveable housing and a means, such as a ball or optical sensors, for sensing the movement of the housing in typically two orthogonal directions over a surface. Two signals are produced representative of movement of the housing in the two directions. Movement of the mouse housing in the two directions over the surface is translated into movement of a cursor in two dimensions on a computer screen.

Trackballs include a generally stationary housing with a ball partially enclosed therein. A user rolls the ball in a desired direction, and rotation of the ball on two orthogonal axes is sensed. Two signals are produced representative of rotation of the ball along the two axes. Rotation of the ball along the two axes is translated into movement of the cursor in two dimensions on the computer screen.

Mice and trackballs and similar input devices generally provide for only two positioning signals with corresponding two-dimensional movement of a cursor or other pointer on a computer screen. With increasing sophistication of computer applications, it has become desirable to provide a way for inputting a third positioning signal useful for three-dimensional movement of a cursor or for variably controlling other attributes of objects or data displayed on a computer screen. Such a signal may be termed a "z input" signal because of its use to provide a positioning input along a third or "z" axis. A mechanism for providing a z input may be termed a z-encoder mechanism.

An advantageous way of providing a z-encoder mechanism is through the use of a rotatable wheel button having a rim protruding through the housing of a mouse or other computer input device. The wheel button may be both rotatable and depressable, and a user may rotate the wheel button with or without simultaneously depressing it. The rotational position of the wheel can be sensed to provide a third positioning signal in a mouse or similar input device. The third positioning signal may be used in any desired fashion, such as for controlling cursor movement along a third axis, or for adjusting other attributes of objects or data displayed on a computer screen. The depression of the wheel button may also be sensed by the encoder mechanism to provide a button signal which may also be used in any desired fashion, such as to control or vary the use of the third positioning signal.

In addition to both a button signal and a third positioning signal, wheel button mechanisms desirably provide tactile and even aural feedback to a user, to allow a user to sense depression and rotation of the wheel button.

Previous wheel button mechanisms for computer mice or similar computer input devices have been excessively complex, with relatively large numbers of parts and relatively complicated construction. For wide-spread adoption and use of such mechanisms to be more easily achieved, a simpler, more economical mechanism is needed.

Accordingly, the present invention provides for a computer input device with a simpler, more elegant, more economical wheel button type z-encoder mechanism. The wheel button is supported on an axle or spindle within the housing of the input device. The axle is supported in the housing by spaced-apart axle supports. The axle supports are configured to allow one end of the axle to move in a direction perpendicular to the axis of rotation of the wheel button such that the wheel button may be depressed, tilting the axle sightly. A spring mounted within the housing is arranged to resist depression of the wheel button.

An optical encoder may be positioned on the axle for rotation with the wheel button. A light source and a light sensor may be mounted within the housing so as to sense the motion of the optical encoder to provide a positioning signal. A microswitch may be mounted within the housing, and a switch engager on the axle may be arranged to depress the microswitch when the wheel button is depressed, thereby providing a button signal. A detent mechanism may also be provided on the axle and may engage a detent spring mounted within the housing to provide a segmented feel to the rotation of the wheel button. The size of the segments may be proportioned to the resolution of the optical encoder.

The foregoing and additional features and advantages of the present invention will be more readily apparent form the following detailed description, which proceeds with reference to the accompanying drawings.

DETAILED DESCRIPTION OF A PREFERRED EMBODIMENT

Figure 1:
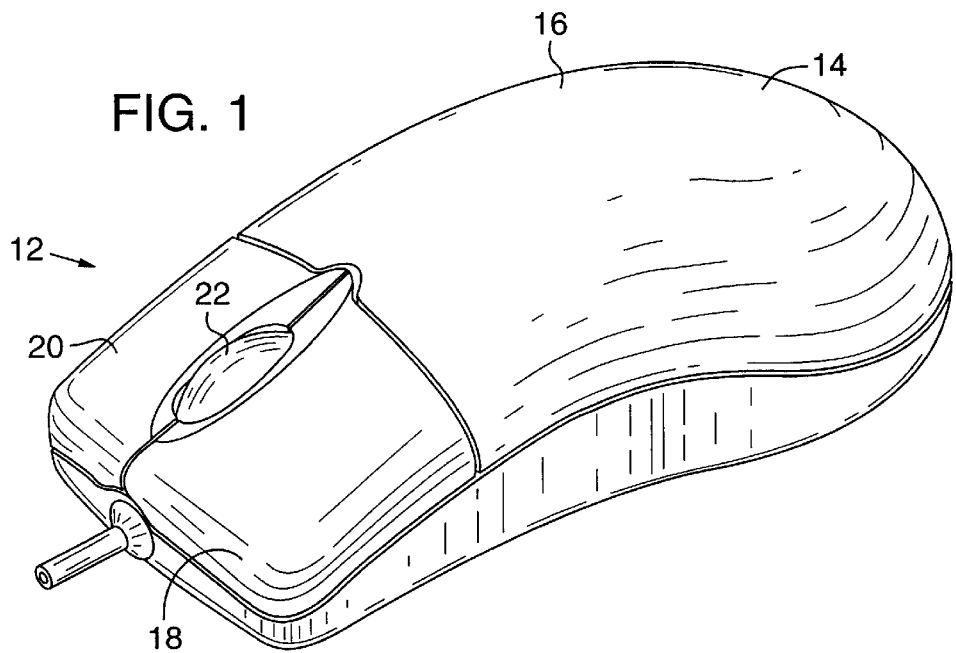
FIG. 1 is a perspective view of the exterior of a mouse incorporating a z-encoder of the present invention.

With reference to FIGS. 1–7, an embodiment of the present invention is illustrated in a mouse. As seen in FIG. 1, a mouse 12 has a plastic housing with an outer surface 14 including an upper surface 16. Left and right mouse buttons 18 and 20 are located on the upper surface 16. A rim or edge of a rotatable wheel button 22 protrudes from the upper surface 16 through a space between the left and right mouse buttons 18 and 20. The surface of the mouse buttons are recessed somewhat in the vicinity of the wheel button.

While the present invention is shown for illustration purposes within a mouse, it will be understood that the upper surface 16 shown in FIG. 1 may also be a surface of a trackball or other input device, and may be disposed other than horizontally, and may vary in other ways from the particular embodiment shown.

Figure 2:
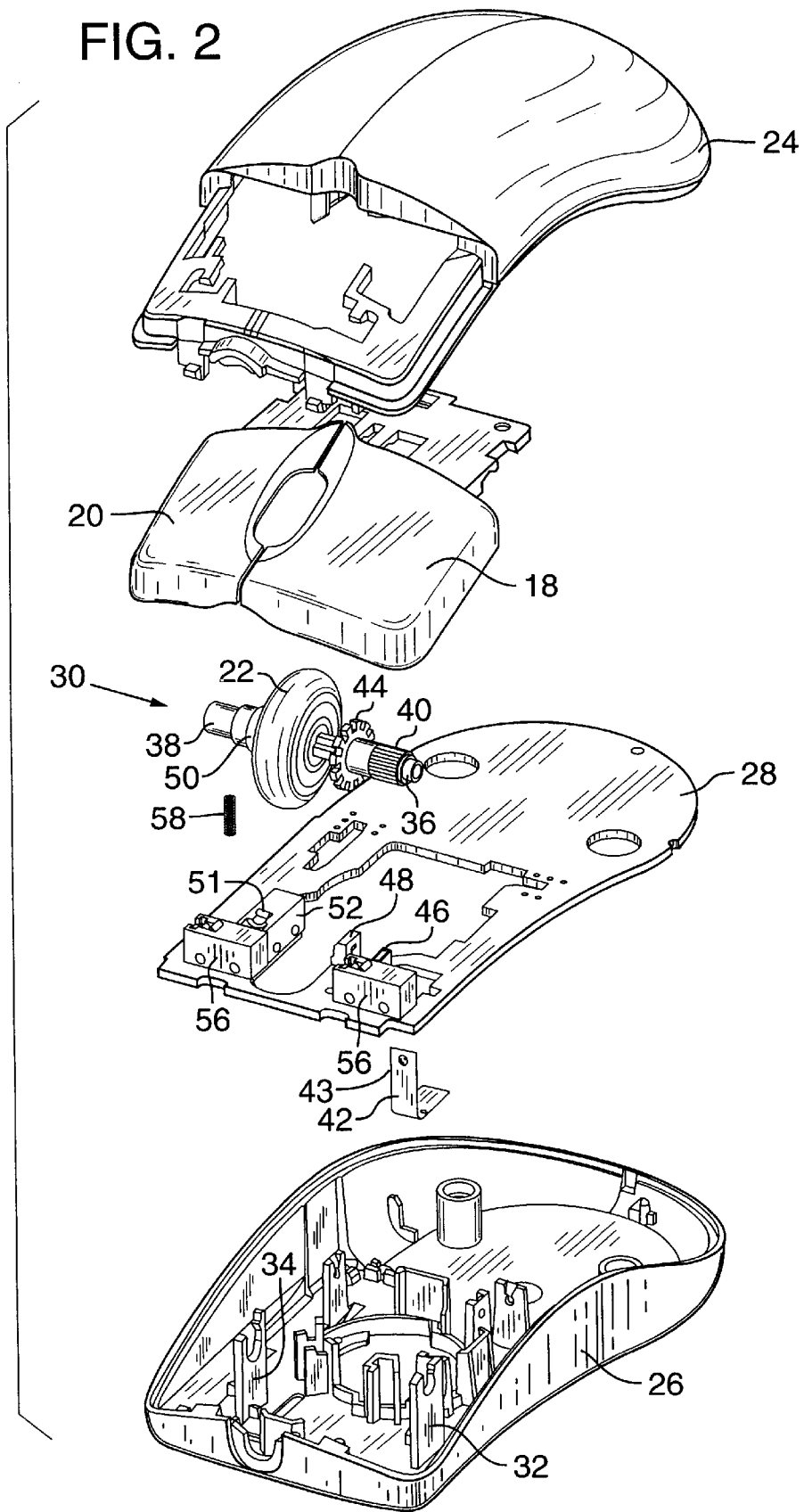
FIG. 2 is an exploded perspective view of certain components of the mouse of FIG. 1.
Figure 4:
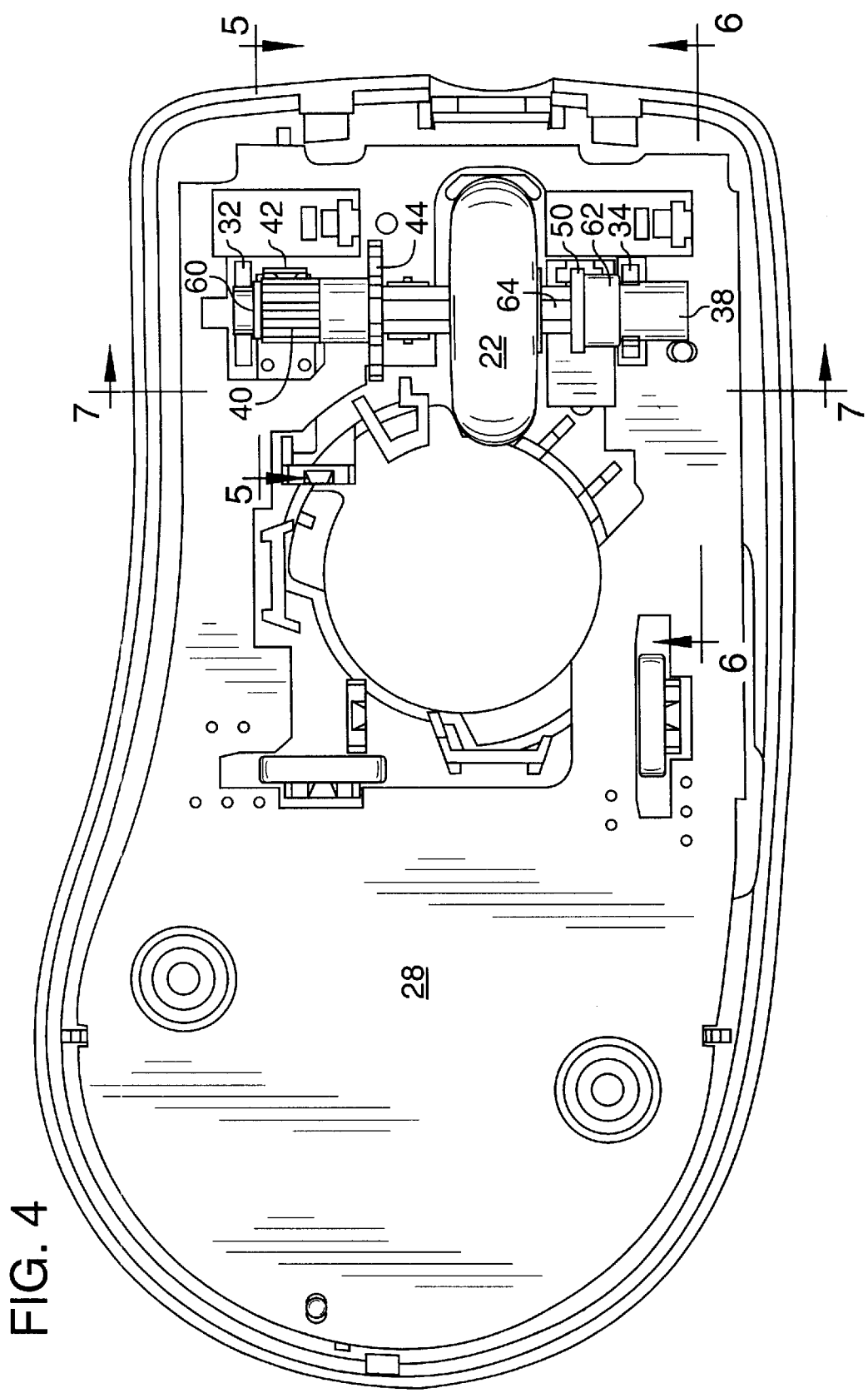
FIG. 4 is a plan view of certain components of the mouse of FIG. 1 with the top of the housing and the associated mouse buttons removed.

As best seen in FIG. 2, the housing includes an upper housing 24 and a lower housing 26. A circuit board 28 is mounted in the lower housing. The wheel button 22 is mounted on an axle or spindle 30. The axle 30 has left and right bearing surfaces 36 and 38 which engage left and right axle supports 32 and 34 respectively. The axle supports 32, 34 extend upwardly from the lower housing, through clearance spaces cut in the circuit board 28.

Figure 3:
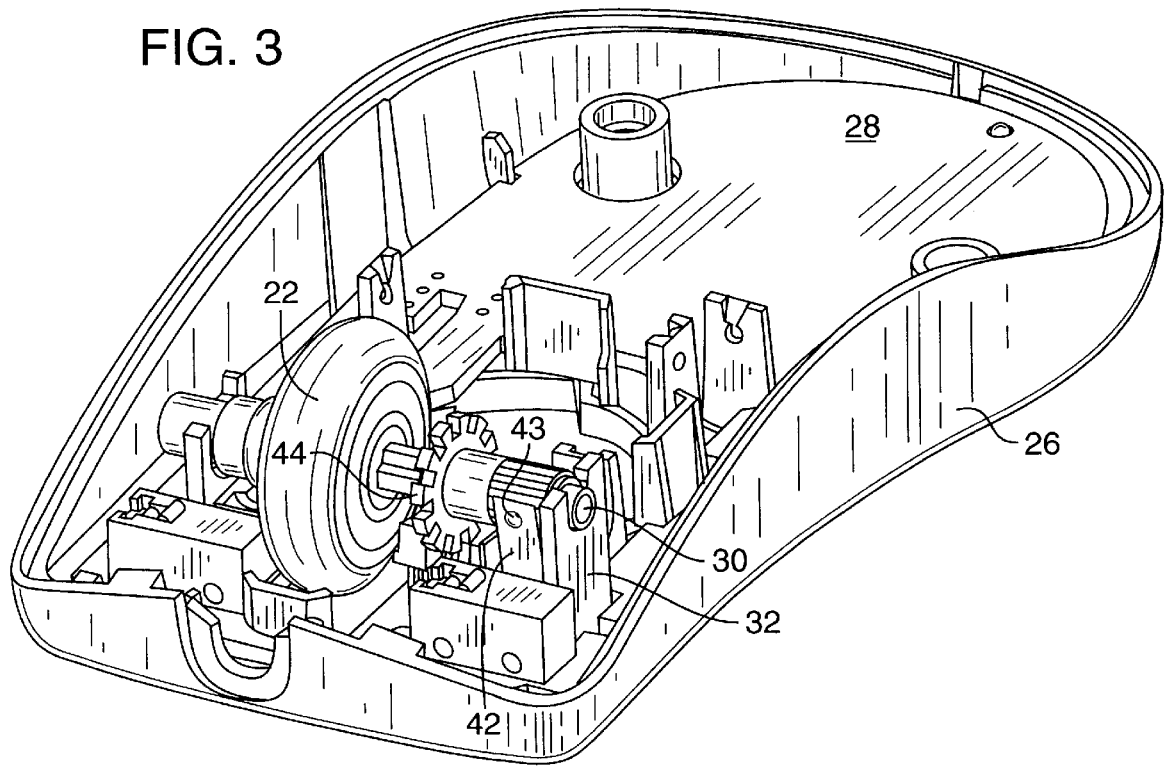
FIG. 3 is smaller scale perspective view of ceratin components of the mouse of FIG. 1 with the top of the housing and associated mouse buttons removed.

As best seen in FIG. 3, the left axle support 32 includes a substantially circular recess conforming to the shape of bearing surface 36. The recess is open at the top, the opening being sufficiently narrow to retain the bearing surface 36 in the circular part of the recess, but wide enough to allow the bearing surface 36 to be snapped out of the recess for replacement. The axle 30 is secured in the recess in the left axle support with sufficient flexibility to pivot slightly, about the support to permit the remainder of the axle to move downwardly. In other words, sufficient flexibility is provided to allow the left axle support to act as a fulcrum about which the axle may pivot slightly.

Figure 6:
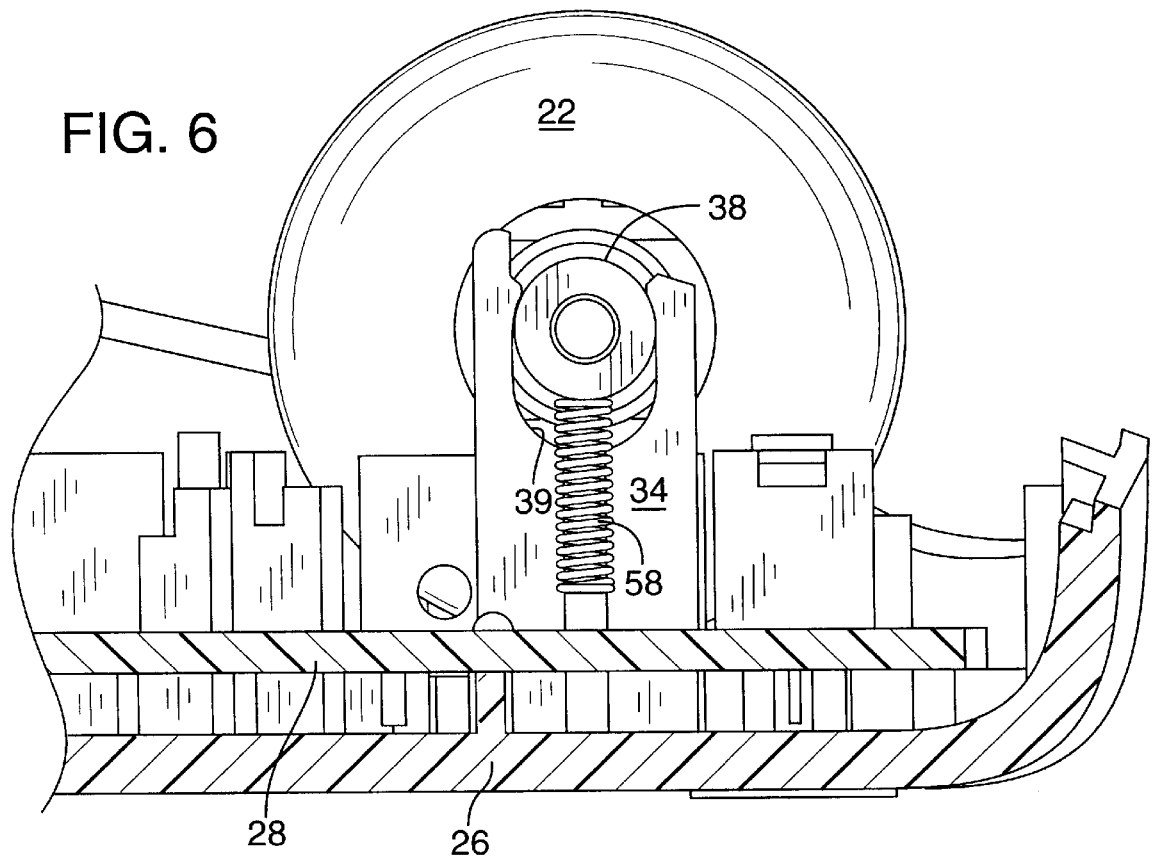
FIG. 6 is a cross-sectional view taken along line 6—6 of FIG. 4.

As best seen in FIG. 6, the right axle support 34 includes a vertically oriented oblong recess 39. The recess has a width about equal to the diameter of the right bearing surface 38 of the axle 30. The recess has curved top and bottom ends with radii about equal to the radius of right bearing surface 38. There is an opening in the top end of the recess sufficiently small to retain the right bearing surface 38 in the recess and sufficiently large to allow the right bearing surface to be snapped out of recess for replacement.

The oblong recess in the right axle support allows the right end of the axle 30 to move downwardly when the wheel button is depressed, such that the axis of rotation of the wheel button 22 tilts slightly within the housing of the mouse. The left end of the axle is mounted to pivot slightly about the left axle support, thereby to facilitate the downward movement of the right end.

The right bearing surface 38 extends axially beyond the right axle support 34, outwardly of the plane of FIG. 6. A spring 58 is mounted in the lower housing 26 and presses against the extended portion of the right bearing surface 38, resisting thereby the depression of the wheel button 22.

Figure 7:
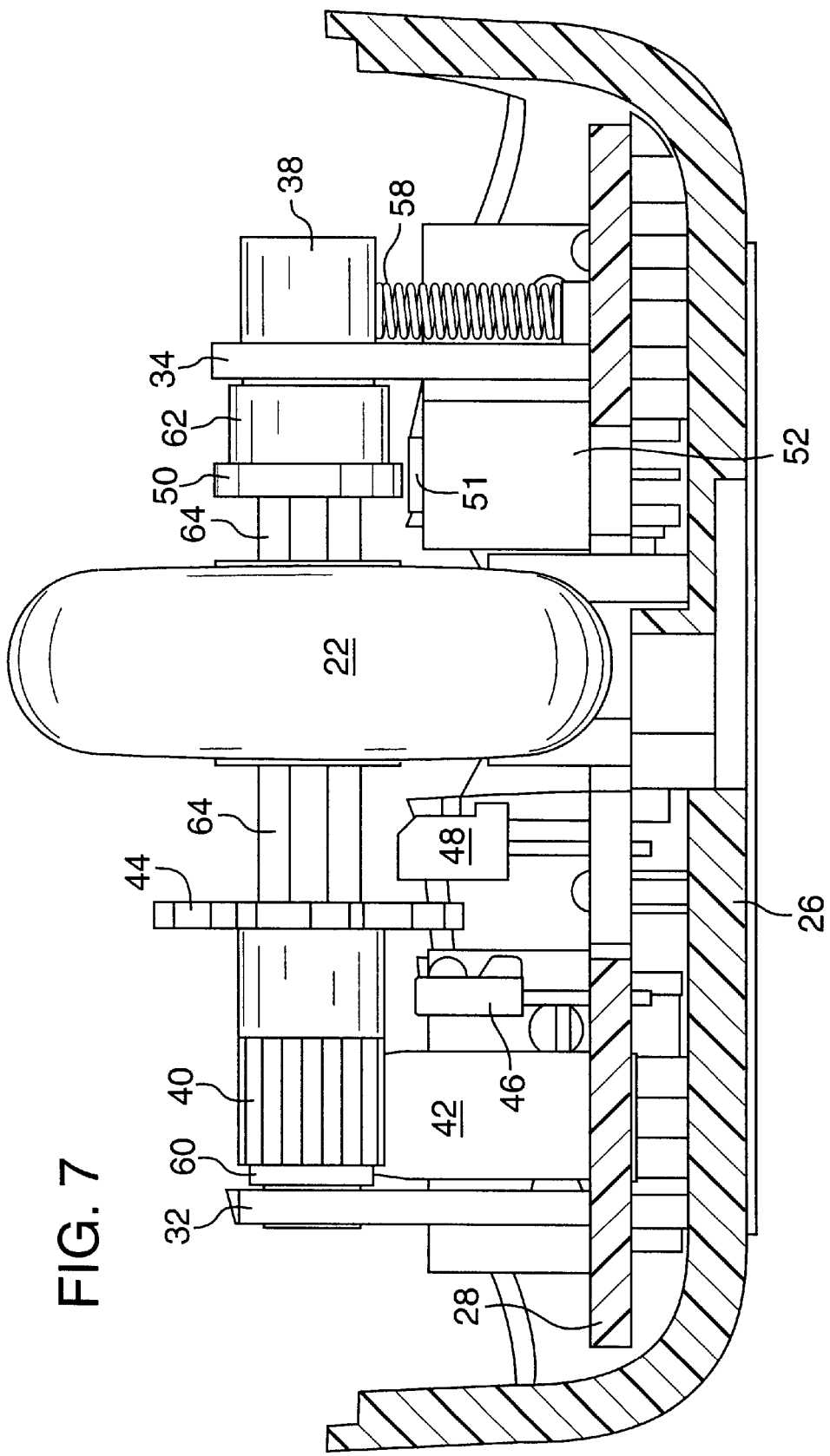
FIG. 7 is a cross-sectional view taken along line 7—7 of FIG. 4.

As seen in FIG. 2, the axle 30 includes an optical encoding wheel 44. As seen in FIG. 7, The blades of optical encoder wheel 44 extend between a light source 46 in the form of an LED and a light detector 48 in the form of a phototransistor. The source 46 and detector 48 are carried on the circuit board 28. Rotation of the wheel button 22 rotates the optical encoder wheel 44, causing the blades of the optical encoder wheel to alternatingly obstruct the light shining from light source 46 toward light detector 48.

Figure 5:
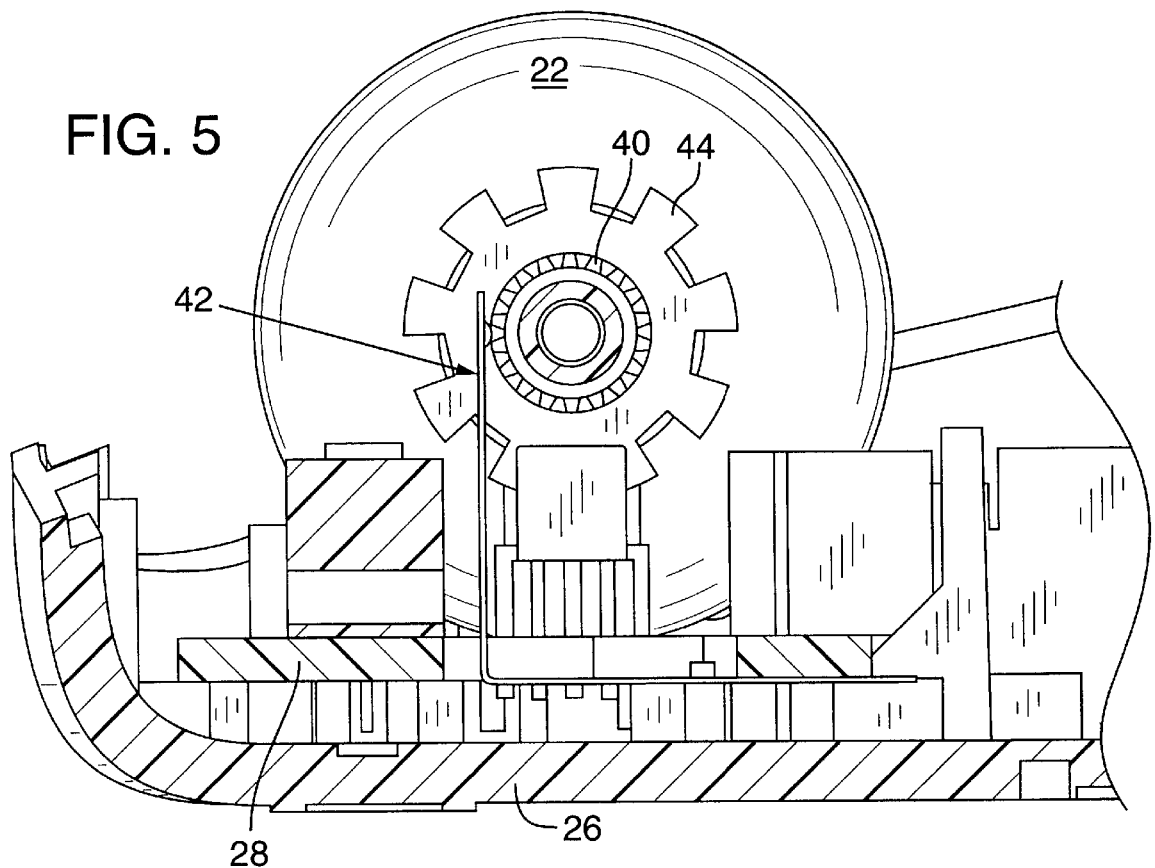
FIG. 5 is a cross-sectional view taken along line 5—5 of FIG. 4.

The axle 30 also includes a detent mechanism 40 in the form of a longitudinally grooved surface on the axle 30. As best seen in FIGS. 3 and 5, the detent mechanism 40 engages a dimple 43 in a detent spring 42 in the form of a leaf spring. The detent spring is secured to the lower housing 26. As the axle 30 rotates, the grooves of the detent mechanism 40 alternatingly engage the dimple 43 on the detent spring 42 to provide a segmented feel to the rotation of the wheel button 22. As seen in FIG. 5, the angular distance between adjacent grooves on detent mechanism 40 is one-half the angular distance between adjacent blades of optical encoder wheel 44, so that the segments may be easily matched to the resolution of the optical encoding performed with optical encoder wheel 44.

The detent mechanism 40, in cooperation with detent spring 42, provides tactile and optionally aural feedback to a user, allowing precise control of the rotation of axle 30. Use of a detent mechanism in the form of a longitudinally grooved surface on the axle 30 cooperating with a housing-mounted spring such as the detent spring 42 results in an economical, easily manufactured, reliable, and wear-resistant means of providing the desired tactile and aural feedback. Proper sizing of the grooves allows a correspondence between the segments felt by a user on rotation of the wheel button and the related signals provided by the input device.

As best seen in FIG. 7, the axle 30 further includes a switch engager 50 in the form of a raised cylindrical surface on the axle 30. The switch engager 50 depresses the switch button 51 of a microswitch 52 when the wheel button 22 is depressed. As seen in FIG. 2, the microswitch 52 is mounted on circuit board 28, along with left and right microswitches 54 and 56, that are activated by left and right mouse buttons 18 and 20 respectively. The microswitch 52 is desirably designed to provide tactile and optionally aural feedback to a user who depresses it.

As also seen in FIG. 7, the axle 30 further includes left and right thrust collars 60 and 62 adjacent respective left and right bearing surfaces 36, 38. Thus, each collar is located on the axle to reside adjacent to a corresponding left and right axle support 32, 34. The collar diameters are sized to retain the axle 30 longitudinally between the left and right axle supports 32 and 34. Where another shape is not required, the axle 30 has ribs 64 to provide good rotational and bending strength with minimal volume.

It may be noted from FIG. 7 that the detent mechanism is located nearest the left axle support 32 so to minimize the motion of the detent mechanism with respect to the detent spring as the wheel button is depressed. The optical encoder is also located nearer to the left axle support 32 than to the right axle support thereby to minimize such motion of the optical encoder wheel relative to the light source and light sensor. The switch engager 50 and the wheel button 22, in contrast, are located nearer to the right axle support than to the left axle support to allow a greater range of motion for these components.

The axle 30 may advantageously be formed of plastic and may be molded as one piece together with the optical encoder wheel, the switch engager, the left and right bearing surfaces, and the detent mechanism. An outer surface or "tire" for the wheel button may be formed of a material having a desirable tactile feel and non-slip characteristics. The tire may then be inserted in a mold for molding the rest of the axle, and the rest of the axle may then be molded within, and thereby joined to, the tire.

The axle 30 provides an essentially one-piece wheel button z-encoding mechanism. The moving parts are limited to the axle 30 (with the wheel button fixed thereto), the springs 42 and 58, and the microswitch button 51. The axle 30 can be rotated in the axle supports to is provide a positioning signal, and can be depressed, pivoting slightly about its attachment point in the left axle support, to provide a button signal. This simple and elegant design provides increased economy in manufacture and reliability in performance.

It should be apparent that the detailed description above is illustrative only and should not be taken as limiting the scope of the invention. For example, the components arranged along the axle 30 need not be arranged in the same order, and selected components may be arranged outside of the axle supports instead of between them, if desired.

Similarly, not all of the functions performed by the embodiment disclosed need be performed in any one mechanism. For example, a detent mechanism for providing a segmented feel may be omitted, if desired, and other, non-segmented means may be used to limit the free rotation of the axle, or the axle may be allowed to spin freely. A position sensing mechanism other than a microswitch and a switch engager may also be employed to sense the slight tilting of the axle within the housing.

Accordingly, the invention should be understood to include all such modifications as come within the scope and spirit of the following claims and equivalents thereto.

What is claimed is:

1. A computer input device comprising:
   (a) a housing having an exterior surface;
   (b) a rotatable wheel having an edge protruding from the housing beyond the exterior surface thereof;
   (c) an axle supported within the housing by a pair of axle supports, the axle supports supporting the axle at spaced-apart locations on the axle, the rotatable wheel being supported by the axle for rotation about the axis of the axle, the axle supports supporting the axle so as to allow one end of the axle to move in a direction perpendicular to the axis of rotation of the rotatable wheel, so that the axle tilts within the housing when the protruding edge of the rotatable wheel is depressed toward the exterior surface of the housing;
   (d) a spring mounted within the housing and arranged to resist displacement of the protruding edge of the rotatable wheel toward the exterior surface of the housing;
   (e) an optical encoding wheel on the axle and rotated by the rotatable wheel;
   (f) a light source and a light sensor within the housing for detecting the movement of the optical encoding wheel;
   (g) a microswitch mounted within the housing; and
   (h) a switch engager on the axle configured to depress the microswitch when the protruding edge of the rotatable wheel is depressed toward the exterior surface of the housing, the spring mounted within the housing and arranged so as to apply a force to a spring engager on the axle, the spring engager being distinct from the switch engager.

2. The computer input device of claim 1, wherein the rotatable wheel is fixed to and centered on the axle for rotation together therewith, and the axle is rotatably supported by the axle supports.

3. The computer input device of claim 2, wherein the switch engager comprises a raised cylindrical surface on the axle adapted to depress the microswitch when the protruding edge of the rotatable wheel is depressed toward the exterior surface of the housing.

4. The computer input device of claim 1, wherein the exterior surface of the housing comprises an upper surface of the housing, and wherein the protruding edge of the rotatable wheel protrudes from the upper surface of the housing.

5. The computer input device of claim 4, further comprising first and second buttons on the upper surface of the housing, the protruding edge of the rotatable wheel protruding from the upper surface of the housing between the first and second buttons.

6. The computer input device of claim 1, wherein the optical encoding wheel comprises a bladed wheel molded together with the axle.

7. The computer input device of claim 1, further comprising a detent mechanism on the axle engaged with a detent spring mounted within the housing.

8. The computer input device of claim 7, wherein the detent mechanism comprises a cylindrical longitudinally grooved surface on the axle, and the detent spring comprises a dimple that engages the longitudinally grooved surface.

9. The computer input device of claim 1, wherein the housing forms the housing of a mouse.

10. The computer input device of claim 1, wherein the housing forms the housing of a trackball.

11. A computer mouse comprising:
    (a) a housing having an upper surface;
    (b) left and right mouse buttons on the upper surface of the housing;
    (c) a rotatable wheel button protruding from the upper surface of the housing between the left and right mouse buttons;
    (d) an axle supported within the housing by a pair of axle supports, the axle supports supporting the axle at spaced-apart locations on the axle, the rotatable wheel button being fixed to the axle between the spaced-apart locations, the axle supports supporting the axle so as to allow the axle to rotate with the rotation of the wheel button and so as to allow a first end only of the axle to move in a direction perpendicular to the axis of rotation of the axle so that the axle tilts within the housing when the wheel button is depressed;
    (e) a spring mounted within the housing and arranged to apply a force generated by the spring to a spring contacting surface of the axle so as to return the axle to its original position when the wheel button is released;
    (f) a microswitch mounted within the housing;
    (g) a switch engaging surface on the axle configured to depress the microswitch when the wheel button is depressed, the switch engaging surface being distinct from the spring contacting surface;
    (h) an optical encoding wheel on the axle;
    (i) a light source and a light sensor within the housing for detecting the movement of the optical encoding wheel; and
    (j) a detent wheel in the form of a cylindrical longitudinally grooved surface on the axle engaging a dimple on a detent spring mounted in the housing to provide a segmented feel to the rotation of the wheel button.

12. The computer mouse of claim 11, wherein the axle support nearest the first end of the axle includes an oblong recess holding therein a circular bearing surface formed on the axle.

13. The computer mouse of claim 11, wherein the wheel button comprises an outer surface formed of a non-slip material.

14. The computer mouse of claim 11 wherein the axle, the optical encoding wheel and the detent wheel are molded together.

15. The computer mouse of claim 11 wherein the axle has a second end and the switch-engaging surface is nearer to the first end of the axle than to the second.

16. The computer mouse of claim 11 wherein the axle has a second end and the optical encoding wheel and the detent wheel are nearer to the second end of the axle than to the first.

17. The computer mouse of claim 11 wherein the axle has a second end and the wheel button is fixed to the axle nearer to the first end of the axle than to the second.

18. The computer mouse of claim 11 wherein the axle extends beneath the upper surface of housing underneath the left and right mouse buttons.

19. The computer mouse of claim 18 wherein the axle has a second end, one of the left and right mouse buttons is larger than the other, and the second end of the axle extends under the larger of the mouse buttons.

20. A computer interface device comprising a spindle having an axis, first and second ends, and longitudinally spaced-apart first and second bearing surfaces, the spindle secured within a housing only by first and second axle supports, the first and second axle supports contacting the spindle at the first and second bearing surfaces, respectively, the spindle including a wheel attached to, and radially centered on the axis of, the spindle, an edge of the wheel extending beyond an exterior surface of the housing, the spindle being secured within the housing so as to allow the spindle to rotate about the axis of the spindle and to pivot, within a given plane, about the first bearing surface.

21. The computer interface device of claim 20 further comprising a position sensor that senses the pivoting of the spindle.

22. The computer interface device of claim 20 further comprising an optical encoder that senses the rotation of the spindle.

23. The computer interface device of claim 20 wherein the housing forms the housing of a mouse.

24. The computer interface device of claim 20 wherein the housing forms the housing of a trackball.

25. A computer input device comprising:

an axle having first and second thrust collars;

a rotatable wheel/button supported on the axle at a location between the first and second thrust collars;

a housing having an outer surface;

a spring within the housing positioned as to apply a force, directed toward the outer surface of the housing, to a location on the axle;

a first axle support having a round recess extending therethrough, the axle extending through the round recess and the first thrust collar abutting the first axle support so as to prevent the axle from moving in a first longitudinal direction;

a second axle support having an oblong recess extending therethrough, the axle extending through the oblong recess and the second thrust collar abutting the second axle support so as to prevent the axle from moving in a second longitudinal direction opposite the first longitudinal direction, the first and second axle supports supporting the axle within the round and oblong recesses such that an edge of the rotatable wheel/button protrudes beyond the outer surface of the housing and such that the axle pivots in the round recess while sliding within the oblong recess when the protruding edge of the rotatable wheel/button is depressed toward the outer surface of the housing, wherein the round and oblong recesses each have an opening oriented toward the outer surface of the housing beyond which the wheel/button protrudes, and the two axle supports are each formed of a resilient material, whereby the axle may be snapped into the recesses during assembly or repair of the computer input device, but is retained securely in the recesses when the protruding edge of wheel/button is depressed toward the outer surface of the housing.

26. The computer input device of claim 25 wherein the axle is supported within the housing by only the two axle supports.

27. The computer input device of claim 26 wherein the axle includes only two thrust collars.

* * * * *